United States Patent Office 3,471,178
Patented Oct. 7, 1969

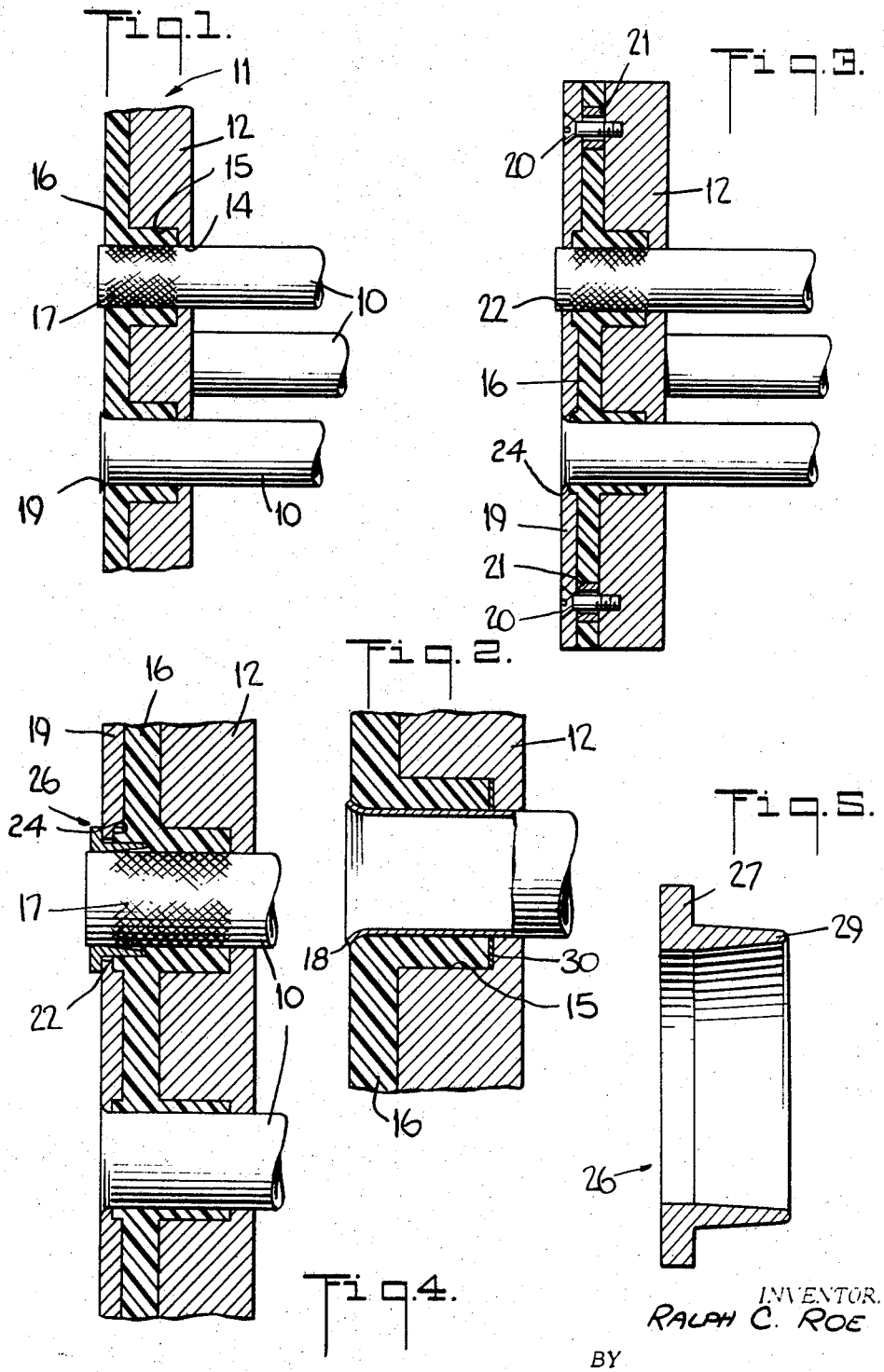

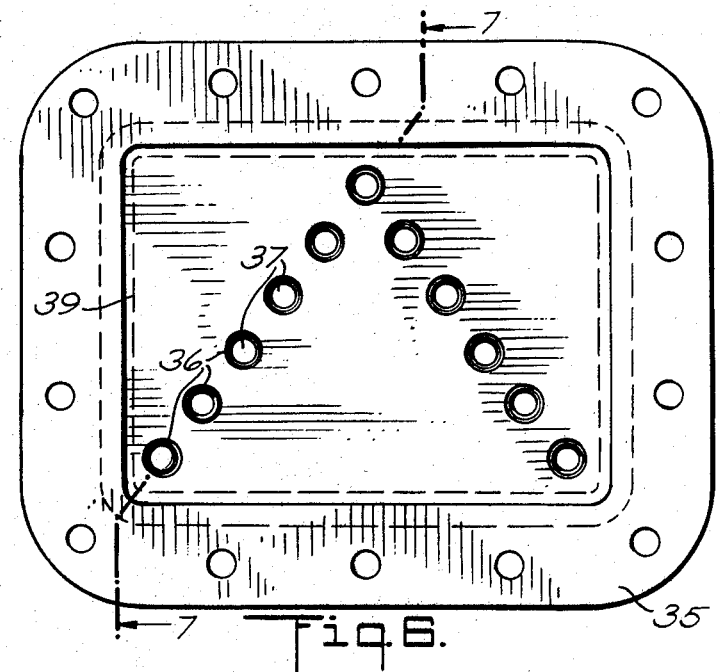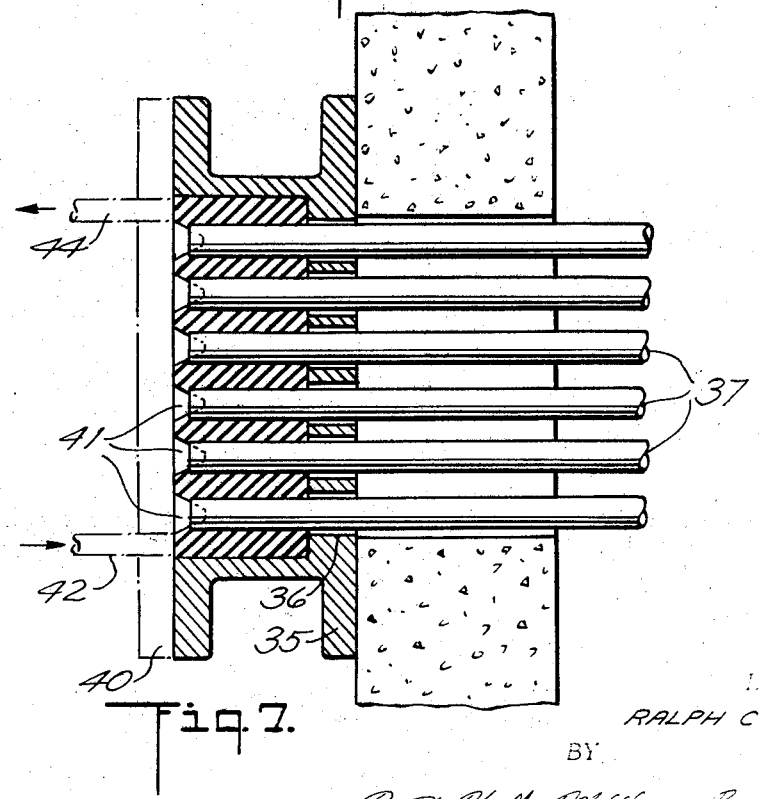

3,471,178
TUBE SHEET CONNECTOR HAVING FLEXIBLE ADHESIVE SEALING MEANS
Ralph C. Roe, Tenafly, N.J., assignor, by mesne assignments, to Saline Water Conversion Corporation, Oradell, N.J., a corporation of New York
Continuation-in-part of application Ser. No. 551,047, May 18, 1966. This application Apr. 17, 1967, Ser. No. 634,028
Int. Cl. F16l 39/00; B29h 21/04
U.S. Cl. 285—137                    12 Claims

ABSTRACT OF THE DISCLOSURE

Tube means permitting heat exchange cooperation between fluid in tube means and fluid exterior of tube means, and tube sheet supporting an end of tube means comprising a plate apertured for passage of tube means therethrough and permitting relative movement between said tube means and said plate and flexible adhesive sealing means covering said plate and surrounding said tube means and sealing same to said plate whereby tube means is free to expand and contract relatively to plate without impairing integrity of seal therebetween.

---

This invention relates to seals for tube sheets and the like and a method of forming same, and more particularly, to flexible seals that permit relative expansion of the tubes and other parts of various types of heat exchangers, while maintaining the integrity of the seal.

This applicatiton is a continuation-in-part of my copending applicatiton Ser. No. 551,047 entitled Tube Sheet Seal, filed May 18, 1966, now abandoned.

Heretofore, in order to provide tubes and other parts of heat exchangers such as feed water heaters, boilers and condensers with the same coefficient of expansion, these parts have often been made of the same material, thus assuring similar degrees of expansion and contraction. Additionally, to seal the tubes and tube sheets together, the tubes were usually rolled into the tube sheets or welded to them, or both. This type of fabrication is time consuming and costly and, unless perfect rolling and welding is achieved, the joints thus formed may not stand up over the expected life of the heat exchanger.

Thus, I have conceived by my invention a novel tube sheet seal that eliminates the foregoing difficulties and disadvantages, and by which I am able to eliminate entirely both the rolled and welded joints of presently known constructions. At the same time, I am able to maintain a high level of seal integrity at the joints between tubes and sheets.

In essence, I contribute tube means for permitting heat exchange cooperation between a fluid in the tube means and a fluid exterior of the tube means, and a tube sheet supporting an end of the tube means comprising a plate apertured for passage of the tube means therethrough, and flexible adhesive sealing means surrounding the tube means and sealing same to the plate whereby the tube means is free to expand and contract relatively to the plate without impairing the integrity of the seal therebetween.

Actually, the tube means may consist of a single tube or any number of tubes depending upon the particular heat exchanger requirements; and, of course, a tube sheet may be provided at each end of the tube means. The sealant may be a silicone rubber flexible adhesive sealant available commercially from the Dow Chemical Company, and may include a catalyst for curing the sealant in applications where the latter will not be exposed to air.

As a feature of my invention, the sealant covers the outer surface of the plate and engages the end of the tube means on the outer side of the plate, thus to adhere to and seal the tube end to the plate. Since the sealant is flexible, the coefficient of expansion of the tube means and other parts of the heat exchanger, such as the shell of a condenser, for example, need not be the same so that advantage may be taken of the characteristics of different materials for the cooperating parts without derogating from the seal integrity. Thus, I may choose to use a plate of cold rolled steel, tubes of cupro-nickel and a steel shell.

The sealant is inert to almost all fluids and can withstand temperatures of the order of 250° F. or higher. Thus, by covering the outer surface of the plate with the sealant, the plate which, as stated may be steel, is protected from corrosive effects of the fluid in the tubes which may be salt water, in a saline water conversion system for example.

I prefer to flare the tube ends or to knurl a zone around the tubes near their ends where the sealant contracts them, both measures being for the purposes of enhancing the adhesion between the sealant and the tubes. Additionally, to increase the area of contact between sealant and tubes, I may counterbore the plate concentrically with the holes or apertures through which the tubes pass thus to provide recesses into which sealant may be placed while in contact with the tubes.

In a modified form of the invention, I employ a second plate spaced outwardly of the first plate so that the sealant is sandwiched between the plates. In this construction, the plates may be bolted together with spacers between the bolts to limit the extent to which the plates are drawn together. The second plate may be recessed similarly to the recessing already described in connection with the first plate; and, if desired, paper washers may be positioned at the bottom of the recesses of either modification to prevent the sealant from adhering to the bottom surfaces of the recesses.

In some applications, particularly high temperature operations, the sealant may expand somewhat also. Thus, in the second or sandwich modification, while the sealant can expand outwardly from between the edges of the plates, some space may be provided near the tubes for expansion. Accordingly, I make the holes in the second or outer plate somewhat oversized and I furnish an insert temporarily surrounding the tube ends and having an annular feathered extension projecting inwardly along the tube. This insert is positioned prior to application of sealant so that when the sealant sets, the insert is withdrawn and a space conforming to the feathered extension remains within which the sealant may expand.

According to a further modification of the invention, the tube sheet or plate, which may be cast of Ni-Resist metal, for example, is coated adjacent the apertures through which the tubes pass with any one of several well-known parting compounds to prevent the sealant from adhering to that portion of the sheet; and preferably the area thus coated with the parting compound is first milled smooth. The remainder of the casting, being uncoated, will provide a surface to which the sealant will adhere.

In practice, the sheet may be cup-shaped with the tube apertures formed in the bottom, the inner surface of which is milled and coated, as already stated, except for a peripheral zone of the order of one inch or so wide so that the sealant will adhere to that zone as well as to the side walls of the sheet. After milling and coating, the tubes are inserted so as to project through the apertures in the sheet, and the sheet is then closed with a temporary cover of plywood or the like which is held firm against the rim of the sheet side walls. Tapered plugs of rubber or the like corresponding in number and position to the number and position of the tubes are carried by the cover so as to extend into the tube ends. The inner surface of the cover and the plugs are coated with the parting compound. The void between sheet and cover is then pumped full of sealant totally surrounding the tube ends and adhering to the tube ends and the sides and uncoated area of the inner surface of the sheet bottom. The cover and plugs are then removed. This method of sealing the tubes to the sheet assures high integrity sealing with maximum flexibility of the sealant to compensate for relative movement of the tubes and sheet due to expansion and contraction.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification wherein:

FIG. 1 is a vertical sectional view through an assembly illustrating my invention;

FIG. 2 is an enlarged fragmentary sectional view illustrating details of a tube joint;

FIG. 3 is a sectional view similar to FIG. 1 but illustrating a modified form of the invention;

FIG. 4 is a view similar to FIG. 3 but illustrating a temporary insert surrounding one of the tubes;

FIG. 5 is a sectional view of one of the inserts;

FIG. 6 is an end elevational view illustrating a further modification of my invention; and FIG. 7 is a cross-sectional view taken along the lines 7—7 of FIG. 6.

Referring now to the drawings, and more particularly to FIG. 1 thereof, there is shown a series of elongate tubes 10 such as would be found in a tube condenser, for example, and a tube sheet 11 supporting and sealing an end of the tubes. Actually, of course, a similar sheet would be employed at the opposite end of the tubes as well. The sheet 11 includes a steel plate 12, apertured as at 14 to receive the tubes 10 and having recesses 15 counterbored concentrically with the apertures, and a layer of flexible adhesive sealant 16 covering the outer surfaces, to the left as viewed, of the plate 12 and extending into the recesses 15. The sealant surrounds and adheres to the ends of the tubes 10 that extend beyond the plate 12.

One of the tubes 10 is shown knurled as at 17 for better adhesion of the sealant, and another is shown flared as at 18 (see FIG. 2) for the same purpose.

FIG. 3 illustrates a construction similar to FIG. 1 but with a second plate 19 preferably of bronze overlying the sealant 16 and secured to the plate 12 by bolts 20 passing through spacers 21. The plate 19 is apertured as at 22 to receive the tube ends and, as is the case with the plate 12, may be formed with recesses 24 to permit a larger area of contact between tube ends and sealant. It will be seen that the knurled portions of the tubes are positioned between the plates 12 and 19; and if the tubes are flared, the apertures 22 of the plate 19 will be chamfered or flared for mating engagement.

It has already been mentioned that in some applications the sealant may expand somewhat and, while it can expand outwardly from between the edges of the plates, some space may be provided near the tubes for expansion. For this purpose, the apertures or holes 22 may be made somewhat oversized in respect of the tubes, as shown in FIG. 4, and an insert 26 may be inserted into the aperture surrounding the tube end. Actually, the insert is positioned before the sealant is applied and may comprise an annular body 27 and an annular feathered extension 29 (FIG. 5) that extends into the space between the plates when the insert is in position. When the sealant sets, the insert is removed so that a space remains conforming to the configuration of the feathered extension into which the sealant may expand.

Referring again to FIG. 2, I have shown a washer 30 which may be made of paper or the like, and which may, if desired, be positioned at the bottom of the recess to prevent sealant from adhering to the metal surface beneath.

By way of example, in a typical tube condenser, the general construction of which will be known to those persons skilled in the art, the tubes may be 42 feet long, made of cupro-nickel, and the condenser shell may be made of steel. The difference in expansion under minimum and maximum temperatures is about ¼-inch, or ⅛-inch at each end. Differences of this order impose a severe burden on conventional tube joints, but are readily compensated for by the present invention.

Turning now to FIGS. 6 and 7, there is shown a modified form of the invention wherein a cupped tube sheet 35 is formed with a plurality of apertures 36 in its bottom for reception of the tubes 37. The sheet 35 may be a casting and the area of its inner bottom surface within the dotted line 39 (FIG. 6) may be milled smooth and coated with parting compound. A suitable cover 40 having tapered plugs 41, both coated with parting compound and the latter arranged to enter and seal the tube ends, is seated on the rim of the sheet, as shown in FIG. 7, and sealant is pumped into the void space around the tube ends in the cupped sheet 35. Pumping may be effected through a sealant inlet 42 in the cover 40 and suitable venting is provided as at 44.

When the void space is filled with sealant, the cover 40 and plugs 41 are removed, the sealant adhering to the tube ends, the sheet side walls and the uncoated peripheral area around the sheet bottom thus to afford a seal of high integrity and flexibility.

From the foregoing description it will be seen that I contribute a tube sheet seal that obviates the need to roll and/or weld the tube ends to the sheet, and the consequent disadvantages of such arrangements; and that my seal assures a high degree of sealing integrity, can withstand high temperatures and protects the surfaces it contacts from corrosion.

I believe that the construction and function of my novel tube sheet seal and method of forming same will now be understood, and that the advantages thereof will be fully appreciated by those persons skilled in the art.

I claim:

1. In apparatus of the class described, a plurality of tubes arranged to permit heat exchange cooperation between a fluid within said tubes and a fluid exterior thereto, a support plate having apertures through which one end of each of said tubes extends, said tubes being of substantially uniform diameter along their length in the vicinity of the plate apertures to permit free longitudinal movement of the tubes with respect to the plate under conditions of expansion and contraction, a flexible adhesive sealing means forming a continuous unitary covering over and adhered to the surface of said plate on the side thereof facing said one end of said tubes, said one end of said tubes passing through said sealing means, said sealing means surrounding and sealed tightly to, and all around the surface of, each tube, parting means operative to maintain said sealing means free of said plate at least in the immediate vicinity of each tube thereby to protect said plate from contact with the fluid within the tubes and at the same time to accommodate expansion movement of the ends of said tubes with respect to said plate.

2. Apparatus according to claim 1, wherein said one end of each said tubes is flared and said sealing means engages said tubes between their flared ends and said surface of said plate.

3. Apparatus according to claim 1, wherein said one end of each of said tubes is knurled and said sealing means engages the knurled portion of said tubes and said surface of said plate.

4. Apparatus according to claim 1 wherein said sealing means adheres to the surface of said support plate throughout a region which surrounds said plurality of tubes.

5. Apparatus according to claim 1 wherein said support plate is cupped to form a depression therein facing said one end of said tubes, said depression having a bottom surface in which said apertures are located and surrounding side surfaces and wherein said sealing means is adhered to said side surfaces.

6. Apparatus according to claim 5 wherein said parting means is arranged to prevent adhesion of said sealing means to said bottom surface.

7. Apparatus according to claim 1 wherein there is provided an additional plate which lies against the exposed surface of said sealing means to sandwich it between said plates, said additional plate being apertured and permitting the ends of said tubes to pass through its apertures.

8. Apparatus according to claim 7, wherein said plates are counterbored concentrically with their apertures to provide an area of surface contact between said sealing means and tubes larger than that afforded by the space between said plates.

9. Apparatus according to claim 7, wherein the ends of said tubes are flared, and the apertures in the additional plate are chamfered at the side thereof facing said one end of said tubes for mating engagement therewith.

10. Apparatus according to claim 7, wherein a surface area of said tubes between said plates is knurled and said sealing means engages the knurled portion of said tubes.

11. Apparatus according to claim 7, wherein said plates are bolted together and spacing means are provided to establish a minimum spacing therebetween.

12. Apparatus according to claim 7, wherein said sealing means is formed with an expansion accommodating recess extending about each of said tubes in the vicinity of said additional plate.

References Cited

UNITED STATES PATENTS

| | | | |
|---|---|---|---|
| 2,092,358 | 9/1937 | Robertson | 285—213 |
| 2,281,594 | 5/1942 | Pearl | 165—82 X |
| 2,303,416 | 12/1942 | Woods | 285—189 X |
| 2,811,337 | 10/1957 | Andersen | 165—82 X |
| 3,326,279 | 6/1967 | Eisberg et al. | 285—189 X |
| 3,291,508 | 12/1966 | Kolthoff | 285—137 X |

FOREIGN PATENTS

| | | |
|---|---|---|
| 799,173 | 3/1936 | France. |
| 865,128 | 2/1941 | France. |
| 1,183,003 | 1/1959 | France. |

THOMAS F. CALLAGHAN, Primary Examiner

U.S. Cl. X.R.

156—289, 537; 264—130, 261; 285—211